Nov. 13, 1923.  1,473,718
J. S. BARNETTE, JR
SAFETY DEVICE FOR STREET CAR TRAILERS
Filed Sept. 2, 1921    2 Sheets-Sheet 2
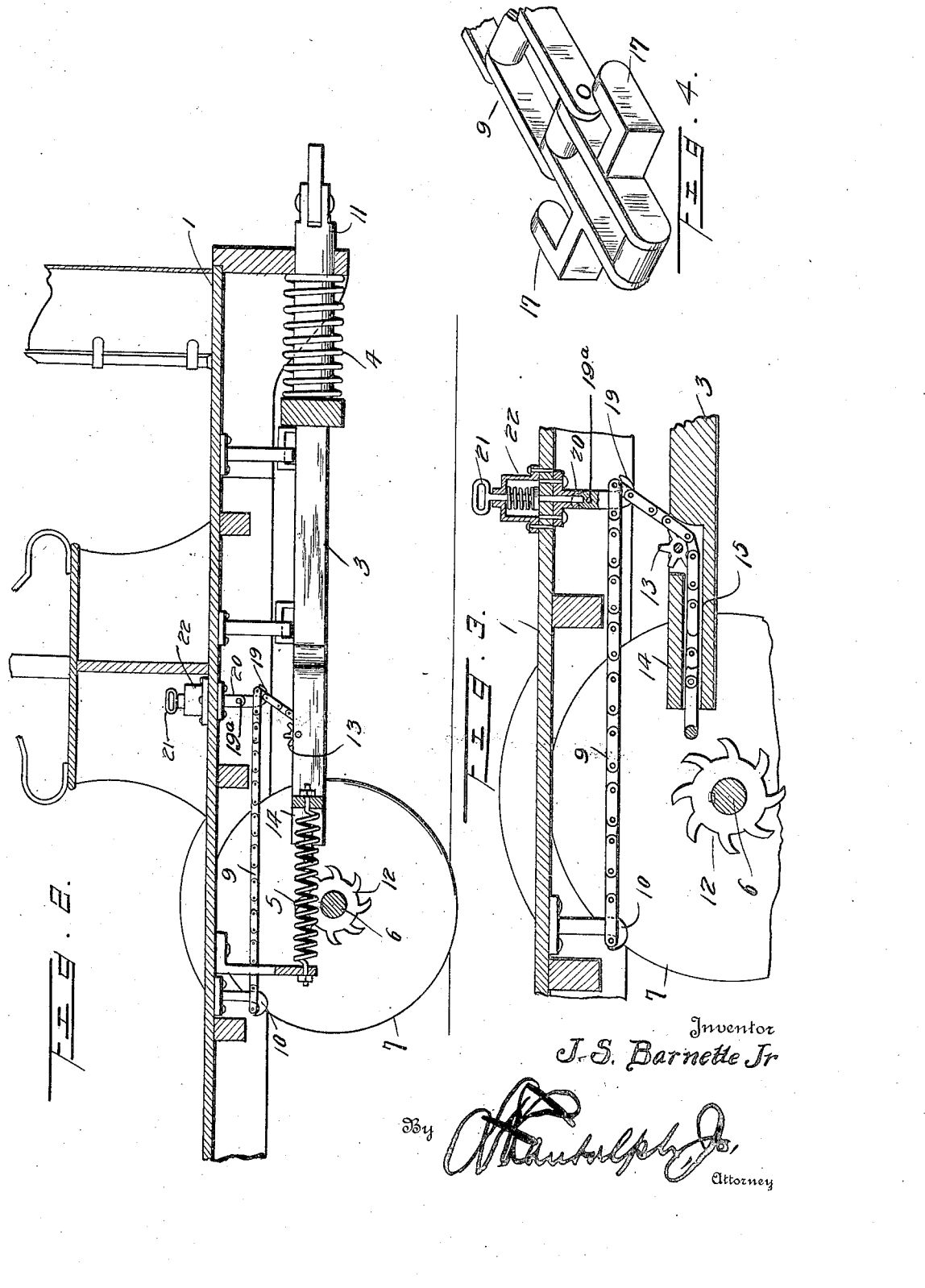
Inventor
J. S. Barnette Jr
By
Attorney Patented Nov. 13, 1923.

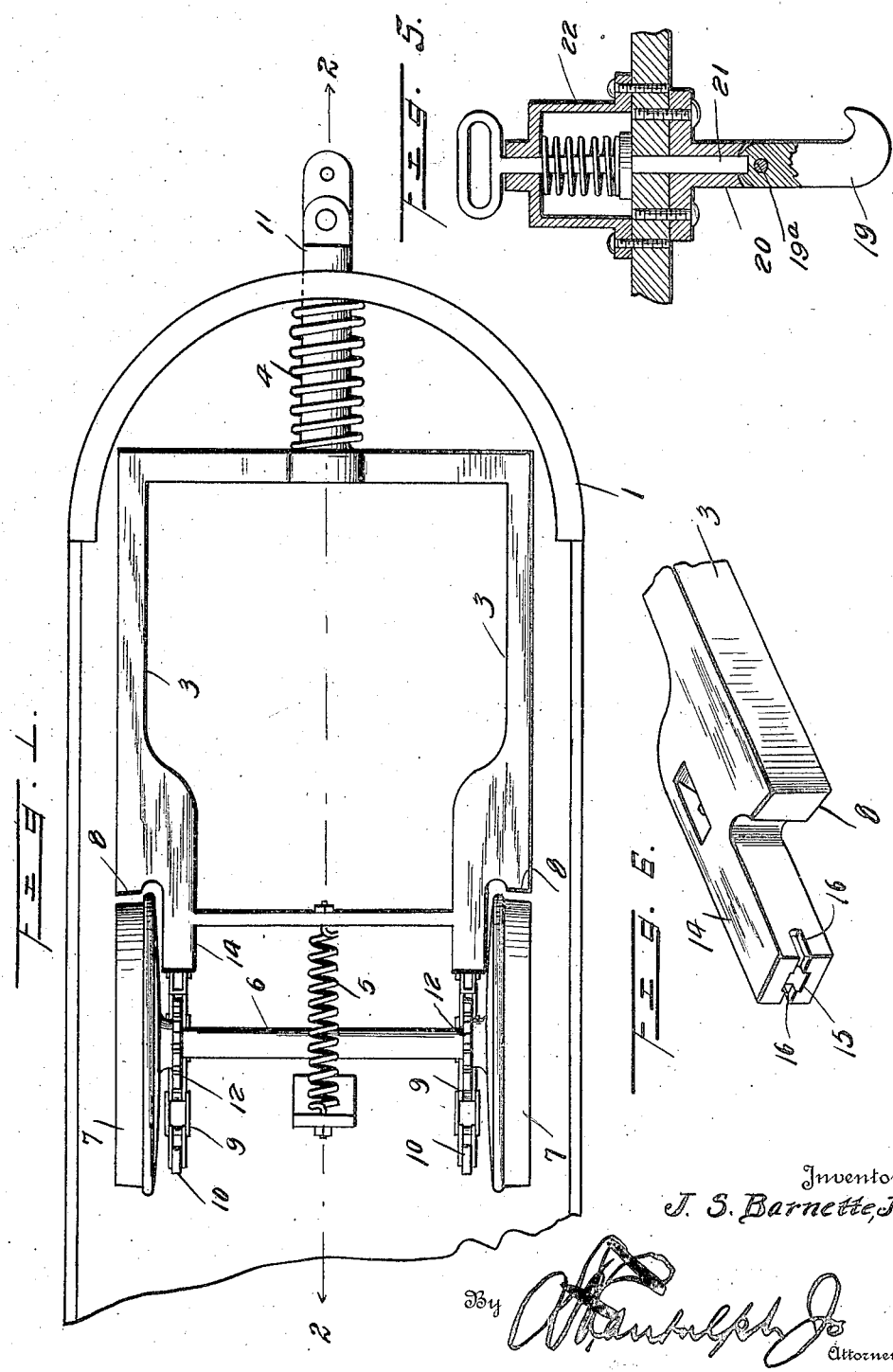

1,473,718

UNITED STATES PATENT OFFICE.

JOHN SPENCER BARNETTE, JR., OF BROUGHTON, PENNSYLVANIA.

SAFETY DEVICE FOR STRET-CAR TRAILERS.

Application filed September 2, 1921. Serial No. 498,055.

*To all whom it may concern:*

Be it known that I, JOHN S. BARNETTE, Jr., a citizen of the United States, residing at Broughton, in the county of Allegheny and State of Pennsylvania, have invented certain new and useful Improvements in Safety Devices for Street-Car Trailers; and I do hereby declare the following to be a full, clear, and extract description of the invention, such as will enable others skilled in the art to which it appertains to make and use the same.

The invention relates to means for automatically operating to prevent a trailer from running backward down grade in the event of the coupling between the motor car and the trailer breaking or otherwise failing to perform its ordinary function.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a bottom plan view of the end portion of a trailer provided with safety means embodying the invention.

Figure 2 is a vertical section on the line 2—2 of Figure 1.

Figure 3 is a detail view showing more clearly the safety means.

Figure 4 is a further detail of the coupling end of the brake applying chain.

Figure 5 is a sectional detail of the supporting and releasing means for the brake applying chain.

Figure 6 is a detail view of the brake end of the sliding frame.

Corresponding and like parts are referred to in the following description and designated in the several views of the drawings by like reference characters.

To demonstrate the application of the invention the forward end portion of a trailer is illustrated and is designated by the numeral 1. A frame 3 is slidably mounted upon the truck or under structure of the trailer and is normally urged in a rearward direction by means of springs 4 and 5. The spring 4 being of the expansible helical type and the spring 5 of the contractile helical type. The numeral 6 designates an axle of the trailer the same being provided with wheels 7 which are adapted to be engaged by brake shoe portions 8 of the sliding frame 3. When the trailer is coupled to the motor car and is drawn forwardly the frame 3 is moved against tension of the springs 4 and 5 so as to carry its brake shoe portion 8 away from the supporting wheels 7. In the event of the coupling breaking or otherwise becoming disabled the trailer is prevented from running backward down grade by the safety means automatically coming into play. The frame 3 when relieved of the draft tension and after actuation of a latch bar to be hereinafter described moves backward through the action of the springs 4 and 5 thereby setting the brake shoes 8 against the wheel 7. Ordinarily this is sufficient to hold the trailer and prevent backward movement thereof. However in the event of the grade being steep the action of the springs 4 and 5 is supplemented by other means which are brought into action by the tendency of the trailer to descend the grade.

A sprocket chain 9 is secured at one end to the frame work of the trailer as indicated at 10. The opposite end of the sprocket chain 9, or like part, is adapted to cooperate with a ratchet wheel 12 secured on the axle 6. The sprocket chain 9, or like part, passes around a guide element 13 on the sliding frame 3. The parts are so disposed that when the frame 3 is moved rearwardly by the action of the springs 4 and 5 the free end of the chain 9 engages a tooth of the ratchet wheel 12. Backward rotation of the axle 6 winds a portion of the chain 9 thereon which tends to draw the frame 3 further backward with the result of more forcibly applying the brakes 8 to the wheels 7. It will be understood that the greater the tension on the chains 9 or like parts the greater will be the application of the brake shoes 8 to the wheels 7 with the result that backward movement of the trailer down the steepest grade is arrested and prevented.

As shown the sliding frame 3 is substantially of U-shape and is provided at its forward end with a draw bar 11 which receives the spring 4 and is adapted to be coupled to the motor car, not shown, in any preferred way. The side members of the frame 3 are widened and extended rearwardly, as indicated at 14. An opening 15 is formed in each of the extensions 14 to receive a cooperating chain 9. Recesses 16 are formed in the end and sides of each extension 14 to receive hooks 17 at the end of the cooperating chain 9 whereby to retain it in normal position, Figure 4. The rear ends of the side members of the frame 3 terminate in the brake shoes 8 which are adapted to engage the threads of the wheels 7.

The brake applying chains 9 are held out of action by hooks 19 which are pivoted at 19ª to brackets 20 secured to the under side of the floor of the trailer. A latch bar 21 normally holds the hook 19 immovable. This latch bar 21 is mounted in a guide 22 and is disposed within convenient reach of the operator to be actuated when it is required to release the hook 19 for swinging movement so that the frame 3 may move the chains 9 into engagement with the toothed wheels 12.

The device is essentially an emergency appliance and is normally held out of action by means of the latch bar 21 engaging the hook 19, whereby rearward movement of the brake member 3 is prevented even though the pulling strain on the coupler should cease. However, when the hook 19 is released from the restraining effect of the latch bar 21 and the pulling strain on the coupler should cease, the brake member 3 will be moved rearwardly by the combined action of the springs 4 and 5, thereby bringing the terminal links of the chains 9 in position to be engaged by the toothed wheels 12 with the result that the lower or free ends of the chains 9 are wound partly about the axle 6 and draw the brake member 3 rearwardly, thereby jamming the brake shoes 8 against the wheels 7 and bringing the trailer to a standstill. Chains 9 remain in engagement with the hooks 19 during this operation and hence will not by sagging or detachment or otherwise engage wheels 12 than as described.

Having thus described the invention, what I claim is:—

1. Safety means for preventing a trailer running backward down grade when released from the motor car or propelling means, the same consisting of a brake member, means exerting a force upon the brake member to apply the same and held in restraint by the propelling force, a flexible connection in engagement with the brake member, and means on the axle to engage the flexible connection and wind the same about the axle to further set the brake when released from the propelling force.

2. Means for preventing backward movement of a trailer when released from the propelling force, the same consisting of a brake member having portions to engage corresponding wheels of the trailer, spring means acting to apply the brake member and held in restraint by the propelling force, flexible connections attached to the brake portion of the brake member, and means on the axle to engage said flexible connections and wind them about the axle and further set the brake when released from the propelling force.

3. Safety means for preventing backward movement of a trailer when relieved of the propelling force, the same comprising a spring actuated brake member, a toothed wheel fast with the axle of the trailer to rotate therewith and means cooperating with said brake member and brought into engaging contact with said toothed wheel whereby to further apply the brake member in the event of the trailer tending to move backward after the brake member has been initially applied.

4. Safety means for preventing backward movement of a trailer when relieved of the propelling force, the same consisting of a brake member, means for automatically applying the brake member, a toothed wheel fast with an axle of the trailer, a flexible member connected at one end with the trailer and engaging said brake member intermediate the ends of said flexible member and an element at the free end of the flexible member to engage a tooth of said toothed wheel when the brake member is applied to further set the same and prevent backward movement of the trailer.

5. A safety means of the character specified, a substantially U-shaped brake member having the rear portions of its side members widened and rearwardly extended, flexible connections engaging the said extensions, means for connecting the flexible connections with the axle, restraining means normally holding the flexible connections clear of the axle connecting means, and means under control of an operator for releasing the restraining means.

In testimony whereof I affix my signature in presence of two witnesses.

JOHN SPENCER BARNETTE, Jr.

Witnesses:
  BERTHA PORTER,
  ROGER S. PORTER.